United States Patent
Wanderski et al.

(10) Patent No.: US 10,461,945 B2
(45) Date of Patent: Oct. 29, 2019

(54) SYSTEM AND METHOD FOR MANAGING COMMUNICATIONS

(71) Applicant: INTERACTIVE INTELLIGENCE GROUP, INC., Indianapolis, IN (US)

(72) Inventors: Anuphinh P. Wanderski, Chapel Hill, NC (US); Cristin K. Kenney, Durham, NC (US)

(*) Notice: Subject to any disclaimer, the term of this patent is extended or adjusted under 35 U.S.C. 154(b) by 68 days.

(21) Appl. No.: 15/712,098

(22) Filed: Sep. 21, 2017

(65) Prior Publication Data

US 2018/0083792 A1   Mar. 22, 2018

Related U.S. Application Data

(60) Provisional application No. 62/397,497, filed on Sep. 21, 2016.

(51) Int. Cl.

| | |
|---|---|
| *G06F 3/00* | (2006.01) |
| *H04L 12/18* | (2006.01) |
| *G06F 16/9535* | (2019.01) |
| *H04L 12/58* | (2006.01) |
| *H04L 29/08* | (2006.01) |
| *G06F 16/907* | (2019.01) |

(52) U.S. Cl.
CPC ........ *H04L 12/1831* (2013.01); *G06F 16/907* (2019.01); *G06F 16/9535* (2019.01); *H04L 12/1822* (2013.01); *H04L 51/046* (2013.01); *H04L 67/14* (2013.01); *H04L 67/22* (2013.01); *H04L 67/28* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 9,444,898 B1 | 9/2016 | Cheng et al. | |
| 2005/0235034 A1* | 10/2005 | Chen | H04L 12/1831 |
| | | | 709/206 |
| 2008/0109406 A1 | 5/2008 | Krishnasamy et al. | |
| 2009/0150397 A1 | 6/2009 | Chen et al. | |
| 2013/0225212 A1 | 8/2013 | Khan | |
| 2015/0067533 A1 | 3/2015 | Volach | |
| 2018/0077101 A1* | 3/2018 | Desouza Sana | G06Q 10/107 |

OTHER PUBLICATIONS

International Search Report and Written Opinion for Application No. PCT/US17/52831, dated Jan. 12, 2018, 15 pages.

* cited by examiner

*Primary Examiner* — Thanh T Vu

(57) ABSTRACT

A communication system includes: a processor; and a memory, the memory storing instructions that, when executed by the processor, cause the processor to: monitor a chat communication session; identify a piece of information exchanged during the chat communication session; compare the piece of information with profile information of a first user participating in the chat communication session; transmit a signal to an electronic device operated by the first user to suggest assigning a tag to the piece of information; receive a request from the electronic device operated by the first user to view the piece of information associated with the tag; and transmit the piece of information to the electronic device for display thereby.

18 Claims, 16 Drawing Sheets

SYSTEM AND METHOD FOR MANAGING COMMUNICATIONS

CROSS-REFERENCE TO RELATED APPLICATION

The present application claims priority to and the benefit of U.S. Provisional Patent Application No. 62/397,497, entitled "SYSTEM AND METHOD FOR TAGGING INFORMATION", filed in the United States Patent and Trademark Office on Sep. 21, 2016, the entire content of which is incorporated herein by reference.

FIELD

Aspects of one or more example embodiments of the present invention relate to a system and method for managing communications.

BACKGROUND

Chat communication, as a communication tool within businesses, is becoming more important as a mechanism to for members of an organization to communication quickly and conveniently. In some cases, a chat platform may provide members of an organization an interface for engaging in ongoing conversations over the course of weeks or months. During the course of such conversations, various pieces of important information may be discussed or conveyed. Because chat communications occur using text, participants in the conversation may be able to refer back to previous comments or statements. As conversations increase in duration, however, it may be difficult for members to easily refer back to specific points in the conversation to obtain particular information that was shared earlier in the conversation. In such cases, participants in the conversation may lose time and have lower efficiency in terms of work productivity if they feel compelled to engage in repetitive or duplicative topics of conversation.

The above information discussed in this Background section is only for enhancement of understanding of the background of the described technology and therefore it may contain information that does not constitute prior art that is already known to a person having ordinary skill in the art.

SUMMARY

Aspects of one or more example embodiments of the present invention relate to a system and method for tagging information.

According to some example embodiments of the present invention, a communication system includes: a processor; and a memory, the memory storing instructions that, when executed by the processor, cause the processor to: monitor a chat communication session; identify a piece of information exchanged during the chat communication session; compare the piece of information with profile information of a first user participating in the chat communication session; transmit a signal to an electronic device operated by the first user to suggest assigning a tag to the piece of information; receive a request from the electronic device operated by the first user to view the piece of information associated with the tag; and transmit the piece of information to the electronic device for display thereby.

According to some example embodiments, the instructions further cause the processor to receive a signal from the electronic device assigning the tag to the piece of information.

According to some example embodiments, the instructions further cause the processor to categorize the piece of information as corresponding to a predetermined category of tags.

According to some example embodiments, the instructions further cause the processor to compare the predetermined category of tags with one or more previous tags assigned by the first user and suggest assigning the tag to the piece of information in response to determining the predetermined category of tags corresponds to the one or more previous tags assigned by the first user.

According to some example embodiments, the instructions further cause the processor to compare the predetermined category of tags with information associated with a profile of the first user and suggest assigning the tag to the piece of information in response to determining the predetermined category of tags corresponds to the information associated with the profile of the first user.

According to some example embodiments, the instructions further cause the processor to: receive a signal from the electronic device assigning the tag to the piece of information; and transmit an alert to a second user not participating in the chat communication session to notify the second user that the tag was assigned to the piece of information.

According to some example embodiments, the instructions further cause the processor to: categorize the piece of information as corresponding to a predetermined category of tags; compare the predetermined category of tags with one or more previous tags assigned by the second user; and transmit the alert to the second user in response to the predetermined category of tags corresponding to the one or more previous tags assigned by the second user.

According to some example embodiments, the instructions further cause the processor to: categorize the piece of information as corresponding to a predetermined category of tags; compare the predetermined category of tags with information associated with a profile of the second user; and transmit the alert to the second user in response to the predetermined category of tags corresponding to the information associated with the profile of the second user.

According to some example embodiments of the present invention, in a method of managing a communication system, the method includes: monitoring, by a processor, a chat communication session; identifying, by the processor, a piece of information exchanged during the chat communication session; comparing, by the processor, the piece of information with profile information of a first user participating in the chat communication session; transmitting, by the processor, a signal to an electronic device operated by the first user to suggest assigning a tag to the piece of information; receiving, by the processor, a request from the electronic device operated by the first user to view the piece of information associated with the tag; and transmitting, by the processor, the piece of information to the electronic device for display thereby.

According to some example embodiments, the method further includes receiving, by the processor, a signal from the electronic device assigning the tag to the piece of information.

According to some example embodiments, the method further includes categorizing, by the processor, the piece of information as corresponding to a predetermined category of tags.

According to some example embodiments, the method further includes comparing, by the processor, the predetermined category of tags with one or more previous tags assigned by the first user and suggest assigning the tag to the piece of information in response to determining the predetermined category of tags corresponds to the one or more previous tags assigned by the first user.

According to some example embodiments, the method further includes comparing, by the processor, the predetermined category of tags with information associated with a profile of the first user and suggest assigning the tag to the piece of information in response to determining the predetermined category of tags corresponds to the information associated with the profile of the first user.

According to some example embodiments, the method further includes: receiving, by the processor, a signal from the electronic device assigning the tag to the piece of information; and transmitting, by the processor, an alert to a second user not participating in the chat communication session to notify the second user that the tag was assigned to the piece of information.

According to some example embodiments, the method further includes: categorizing, by the processor, the piece of information as corresponding to a predetermined category of tags; comparing, by the processor, the predetermined category of tags with one or more previous tags assigned by the second user; and transmitting, by the processor, the alert to the second user in response to the predetermined category of tags corresponding to the one or more previous tags assigned by the second user.

According to some example embodiments, the method further includes: categorizing, by the processor, the piece of information as corresponding to a predetermined category of tags; comparing, by the processor, the predetermined category of tags with information associated with a profile of the second user; and transmitting, by the processor the alert to the second user in response to the predetermined category of tags corresponding to the information associated with the profile of the second user.

According to some example embodiments, a communication system includes: means for monitoring a chat communication session; means for identifying a piece of information exchanged during the chat communication session; means for comparing the piece of information with profile information of a first user participating in the chat communication session; means for transmitting a signal to an electronic device operated by the first user to suggest assigning a tag to the piece of information; means for receiving a request from the electronic device operated by the first user to view the piece of information associated with the tag; and transmitting, by the processor, the piece of information to the electronic device for display thereby.

According to some example embodiments, the system further includes means for receiving a signal from the electronic device assigning the tag to the piece of information.

According to some example embodiments, the system further includes: means for categorizing the piece of information as corresponding to a predetermined category of tags; and means for comparing the predetermined category of tags with one or more previous tags assigned by the first user and suggest assigning the tag to the piece of information in response to determining the predetermined category of tags corresponds to the one or more previous tags assigned by the first user.

According to some example embodiments, the system further includes: means for categorizing the piece of information as corresponding to a predetermined category of tags; and means for comparing the predetermined category of tags with information associated with a profile of the first user and suggest assigning the tag to the piece of information in response to determining the predetermined category of tags corresponds to the information associated with the profile of the first user.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

Figure 1:
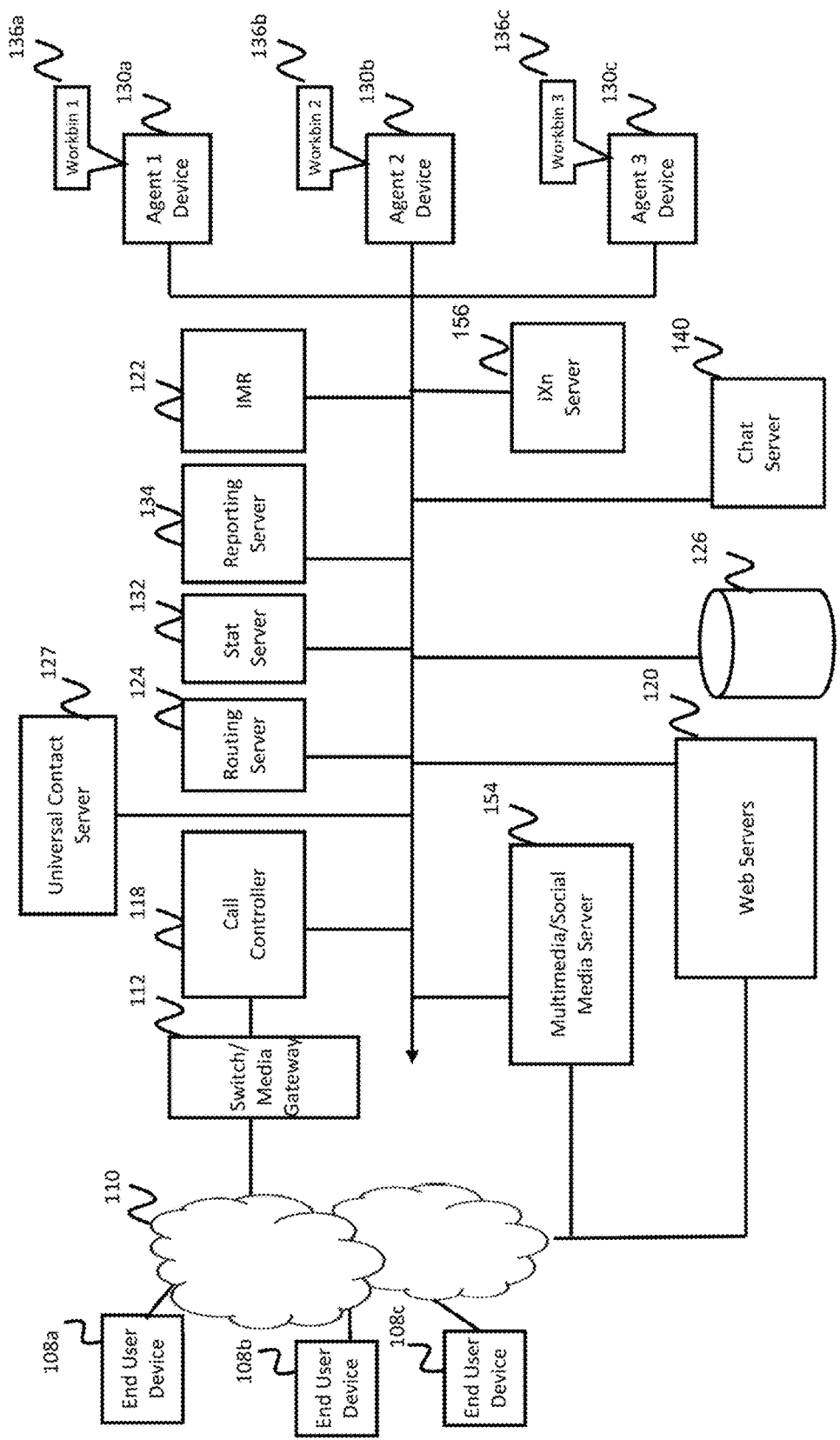
FIG. 1 is a block diagram of a system for engaging and managing conversations between users, according to some embodiments of the present invention.

Aspects of one or more example embodiments of the present invention relate to a system and method for tagging information.

Chat communication, as a communication tool within businesses, is becoming more important as a mechanism to for members of an organization to communication quickly and conveniently. In some cases, a chat platform may provide members of an organization an interface for engaging in ongoing conversations over the course of weeks or months. During the course of such conversations, various pieces of important information may be discussed or conveyed. Because chat communications occur using text, participants in the conversation may be able to refer back to previous comments or statements. As conversations increase in duration, however, it may be difficult for members to easily refer back to specific points in the conversation to obtain particular information that was shared earlier in the conversation. In such cases, participants in the conversation may lose time and have lower efficiency in terms of work productivity if they feel compelled to engage in repetitive or duplicative topics of conversation. For example, team members may share information about upcoming meetings, documents, passwords, work product, and the like, and the team members may have a desire to refer back to such information regularly. When shared information is merely available by scrolling through long chat conversations, or by searching keywords, users may find it difficult to efficiently retrieve the information they are seeking.

As will be described in more detail below, embodiments of the present invention, therefore, provide a mechanism to enable participants in a chat communication session to identify or tag important portions of a conversation for later referencing.

For chat communication sessions where there are only two parties, a user can bookmark any comment or comments in a one-on-one private conversation for later reference. These bookmarks, or tags, allow a user to mark information for future reference. The tags are collected and displayed for the user in a separate panel within a graphical user interface. Tags may be saved with the user's record of the conversation where the system collects the information and saves the information for each user. The user may then view the tags and filter the tags accordingly in the panel for quicker reference. Actions may also be performed on the tags such as sharing or exporting any bookmark or piece of conversation to another chat, a task management system, email, or within another part of the current system.

Group chats of more than two parties may be more open to parties coming and going. When users tag information during the course of a chat communication session, the tag may be accessible to other users participating in the same chat communication session, or may be accessible only to the user who tagged the information. Additionally, when a user tags information, the tag and information about the tag (e.g., the category of the tag, or the information tagged) may be saved by the system in memory as part of the user's profile.

Within a group chat, a user can choose to bookmark a portion of the conversation for the group (making the bookmark public to the chat room) or keep a selection of private bookmarks. A bookmark may be visible in a listing of bookmarks for all participants in a group chat, such as a table of contents for users who are new to the conversation. Within the group chat, when a user leaves the group chat and comes back, the party may still be able to view the entire group chat history, based on the settings for the chat session. Thus, the user may still be enabled to view chats that occurred between the time of leaving the chat session and returning. A user also has an option to keep certain bookmarks private, without sharing them with one or more members of the group.

The terms "tag" and "bookmark" as used herein are used interchangeably, and a bookmark may be defined as a flag on a text-selection within the conversation, or information or data exchanged during the conversation, such as documents or projects that are shared. A user can bookmark a single comment in a conversation or a series of comments by highlighting text and choosing to flag that body of the text. Bookmarks may persist as long as the user who created them does not remove/delete them. In some example embodiments, when a group chat occurs, any participant to the group chat may edit (e.g., remove/delete) bookmarks. In some embodiments, a user may view bookmarks through a panel in the conversation window. A user may open and select bookmarks to navigate to the text through this panel.

The system can also generate new bookmarks for various pieces of information and provide them for the user in the bookmark panel. Users may also have the option to filter out bookmarks that they don't want to see in their panel. For example, if a particular user does not care about system-suggested bookmarks the user can choose a filtered view that is of her personal previous bookmarks only.

Furthermore, the user may be able to share or export any bookmark or piece of conversation to another chat, a task management system, email, or within another part of the current system (e.g., activity stream, status message, etc.). In order for a user to share or export a bookmark, an action may be present in the user interface that allows the user to share this with another user of the system. The "explore and share" functionality could be within the context of the same framework (such as another chat) or be extended to work across systems and shared via email, task management systems, etc.

According to some embodiments, the system may suggest certain bookmarks to be displayed to new users or specific users when they join or enter a chat conversation. For example, the system may display bookmarks or tags that correspond to summary information or background information that the user may be interested in reviewing. Additionally, according to some embodiments, the system may be configured to suggest or recommend bookmarks or tags in response to a specific event (e.g., a video or computer call) occurring.

According to some embodiments, machine learning may also be leveraged to learn about the users' patterns in chats. Noise and chatter may be automatically removed when a user is not active and relevant information extracted for the user to digest. This relevant information may be sent to a new window in a user interface accessible to the user. Suggestions of information may also be made to the user, such as where information is found which might be of interest to the user (such as related to a particular project or topic of interest). Alternatively, the system may have learned which topics or projects a user tends to respond to and automatically send information on those to the user. The information may be compiled by the system and sent to the user, thus eliminated the need for a user to have to intensively search through multiple chat histories and chat rooms. Common conversations may also be linked, enabling a user to follow all needed information around a project without having to search for it. A user may also be notified when a topic is mentioned that is of interest to them in another chat room so that the user may choose to follow that topic.

Embodiments of the present invention provide a system and method for facilitating and managing more efficient communication between members of an organization. Further details of the system described above will be explained below with respect to the figures.

In the various embodiments, the terms interaction and communication are used generally to refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

FIG. 1 is a block diagram of a system for engaging and managing conversations between users (hereinafter referred to as a communication management system 100), according to some embodiments of the present invention. In some embodiments, the communication management system 100 may operate as part of a contact center system 102. The contact center system may be an in-house facility to a business or enterprise 104 for serving the enterprise in performing the functions of sales and service relative to the products and services available through the enterprise. In another aspect, the contact center system 102 may be operated by a third-party service provider. According to another embodiment, the contact center system 102 may operate as a hybrid system in which some components of the contact center system 102 are hosted at the contact center premise and other components are hosted remotely (e.g., in a cloud-based environment). The contact center system 102 may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center may also be distributed across various geographic locations and computing environments and not necessarily contained in a single location, computing environment, or even computing device.

According to one example embodiment, the contact center system 102 includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers or end users, e.g., end user 106) desiring to receive services from the contact center system 102 or the business 104 may initiate an inbound communication to the contact center system 102 via their end user devices 108a-108c (collectively referenced as electronic device 108).

Each of the electronic devices 108 may be a communication device conventional in the art, such as, for example, a telephone, wireless phone, smart phone, personal computer, electronic tablet, and/or the like, that is configured to engage in text-based (e.g., chat) communications with other electronic devices. According to some embodiments, users operating the electronic devices 108 may communicate with the contact center system 102 by way of a voice channel, and the communication may be converted into text either at the end user or contact center side. The text may then be transmitted to a chat bot (described in more detail below), and the response from the chat bot may be converted back into speech or delivered to the end user's device as text. Users operating the electronic devices 108 may initiate, manage, and respond to telephone calls, emails, chats, text messaging, web-browsing sessions, and other multi-media transactions.

Inbound and outbound communications from and to the electronic devices 108 may traverse the telephone, cellular, and/or data communication network 110 depending on the type of device that is being used. For example, the communications network 110 may include a private or public switched telephone network (PSTN), local area network (LAN), private wide area network (WAN), and/or public wide area network such as, for example, the Internet. The communications network 110 may also include a wireless carrier network including a code division multiple access (CDMA) network, global system for mobile communications (GSM) network, and/or any 3G or 4G network conventional in the art.

According to one exemplary embodiment, the contact center system 102 includes a switch/media gateway 112 coupled to the communications network 110 for receiving and transmitting telephony interactions between end users and the contact center system 102. The switch/media gateway 112 may include a telephony switch or communication switch configured to function as a central switch for agent level routing within the center. The switch may be a hardware switching system or a soft switch implemented via software. In this regard, the switch 112 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony device. In this example, the switch/media gateway establishes a voice path/connection (not shown) between the calling customer and the agent telephony device, by establishing, for example, a connection between the customer's telephony device and the agent telephony device.

According to one exemplary embodiment of the invention, the switch is coupled to a call controller 118 which may, for example, serve as an adapter or interface between the switch and the remainder of the routing, monitoring, and other communication-handling components of the contact center.

The call controller 118 may be configured to process PSTN calls, VoIP calls, and the like. For example, the call controller 118 may be configured with computer-telephony integration (CTI) software for interfacing with the switch/media gateway and contact center equipment. In one embodiment, the call controller 118 may include a session initiation protocol (SIP) server for processing SIP calls. According to some exemplary embodiments, the call controller 118 may, for example, extract data about the customer interaction such as the caller's telephone number, often known as the automatic number identification (ANI) number, or the customer's internet protocol (IP) address, or email address, and communicate with other CC components in processing the interaction.

According to one exemplary embodiment of the invention, the system further includes an interactive media response (IMR) server 122, which may also be referred to as a self-help system, virtual assistant, or the like. The IMR server 122 may be similar to an interactive voice response (IVR) server, except that the IMR server 122 is not restricted to voice, but may cover a variety of media channels including voice. Taking voice as an example, however, the IMR server may be configured with an IMR script for querying customers on their needs. For example, a contact center for a bank may tell customers, via the IMR script, to "press 1" if they wish to get an account balance. If this is the case, through continued interaction with the IMR server 122, customers may complete service without needing to speak with an agent. The IMR server 122 may also ask an open ended question such as, for example, "How can I help you?" and the customer may speak or otherwise enter a reason for contacting the contact center. The customer's response may then be used by the routing server 124 to route the call or communication to an appropriate contact center system 102 resource.

If the communication is to be routed to an agent, the call controller 118 interacts with a routing server 124 to find an appropriate agent for processing the interaction. The selection of an appropriate agent for routing an inbound interaction may be based, for example, on a routing strategy employed by the routing server 124, and further based on information about agent availability, skills, and other routing parameters provided, for example, by a statistics server 132.

In some embodiments, the routing server 124 may query a customer database, which stores information about existing clients, such as contact information, service level agreement (SLA) requirements, nature of previous customer contacts and actions taken by contact center to resolve any customer issues, and the like. The database may be managed by any database management system conventional in the art, such as Oracle, IBM DB2, Microsoft SQL server, Microsoft Access, PostgreSQL, MySQL, FoxPro, NoSQL, SQLite, and the like, and may be stored in a mass storage device 126. The routing server 124 may query the customer information from the customer database via an ANI or any other information collected by the IMR 122.

Once an appropriate agent is identified as being available to handle a communication, a connection may be made between the customer and an agent device 130a-130d (collectively referenced as 130) of the identified agent. Collected information about the customer and/or the customer's historical information may also be provided to the agent device for aiding the agent in better servicing the communication. In this regard, each agent device 130 may include a telephone adapted for regular telephone calls, VoIP calls, and the like. The agent device 130 may also include a computer for communicating with one or more servers of the contact center and performing data processing associated with contact center operations, and for interfacing with customers via voice and other multimedia communication mechanisms. According to some embodiments, one or more agents or supervising agents 160 may operate one or more agent devices 130d in communication with the components of the contact center system 102 by way of the data communication network 110.

The contact center system may also include a multimedia/social media server 154 for engaging in media interactions other than voice interactions with the end user devices 108. The media interactions may be related, for example, to email, vmail (voice mail through email), chat, video, text-messaging, web, social media, co-browsing, and the like. In this regard, the multimedia/social media server 154 may take the form of any IP router conventional in the art with specialized hardware and software for receiving, processing, and forwarding multi-media events. According to some embodiments, the multimedia/social media server 154 may be configured to maintain chat conversations, generate chat transcripts, and determine whether or not a chat communication is completed (e.g., based on timeout or by a customer closing a chat window). Additionally, the multimedia/social media server 154 may be configured to keep a chat session alive even when a particular chat server instance crashes, and also process or facilitate chat transfers and conference sessions.

The web servers 120 may include, for example, social interaction site hosts for a variety of known social interaction sites to which an end user may subscribe, such as, for example, Facebook, Twitter, and the like. In this regard, although in the embodiment of FIG. 1 the web servers 120 are depicted as being part of the contact center system 102, the web servers may also be provided by third parties and/or be maintained outside of the contact center. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an interaction (iXn) server 156 interacts with the routing server 124 for selecting an appropriate agent to handle the activity. Once assigned to an agent, an activity may be pushed to the agent, or may appear in the agent's workbin 136a-136c (collectively referenced as 136) as a task to be completed by the agent. The agent's workbin may be implemented via any data structure conventional in the art, such as, for example, a linked list, array, and/or the like. The workbin 136 may be maintained, for example, in buffer memory of each agent device 130.

According to one exemplary embodiment of the invention, the mass storage device(s) 126 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like.

According to one embodiment, some of the data (e.g. customer profile data) may be maintained in a customer relations management (CRM) database hosted in the mass storage device 126 or elsewhere. The mass storage device may take form of a hard disk or disk array, flash memory, magnetic table, or other suitable mass storage device as is conventional in the art, for storing information used as part of the communication management system 100 and the contact center system 102.

According to some embodiments, the contact center system 102 may include a universal contact server (UCS) 127, configured to retrieve information stored in the CRM database and direct information to be stored in the CRM database. For example, the UCS 127 may be utilized as part of the communication management system 100 to facilitate maintaining a history on how well a particular chat bot (described in more detail below) functions for a given customer as a reference for future chat communications. The UCS 127 may also be configured to facilitate maintaining a history of customers' preferences regarding media channels, such as instances in which chat communications are acceptable and instances in which customers prefer alternate media channels. Additionally, the UCS 127 may be configured to capture and store data regarding comments from agents, customer communication history, and the like.

The contact center system 102 may additionally include a knowledge management server 150 for facilitating interactions between customers operating the end user devices 108a-108c and a knowledge system 152 (which may be included as part of the contact center system 102, or may be operated remotely by a third party). The knowledge management server 152 is a computer system capable of receiving questions and providing answers as output. According to some example embodiments, the knowledge system may be embodied as IBM Watson®. Of course, any other knowledge system may be used as will be appreciated by a person having ordinary skill in the art. In some embodiments, the knowledge system 152 is an artificially intelligent computer system capable of answering questions posed in natural language by retrieving information from information sources such as encyclopedias, dictionaries, newswire articles, literary works, or other documents submitted to the knowledge system 152 as reference materials, as is well known in the art. Additional details of the knowledge management server is provided in U.S. application Ser. No. 14/449,018, filed on Jul. 31, 2014, entitled "System and Method for Controlled Knowledge System Management," the content of which is incorporated herein by reference.

The contact center system 102 may additionally include a chat server 140 for conducting automated/electronic chat communications with agents operating agent devices 130. According to some embodiments, the chat server 140 may operate as a chat orchestration server, dispatching actual chat conversations to various chat bots or agent chats. The processing logic of the chat server 140 may be rules driven, and may leverage, for example, intelligent workload distribution protocols and various business rules for routing communications.

According to some embodiments, the chat server 140 is coupled to and in communication with the interaction server 156, statistics server 132, a data collection server 162, the call controller 118, and/or the like, for retrieving data regarding ongoing contact center operations and performance metrics in real time. Although the chat server 140 is depicted in the embodiment of FIG. 1 as being a separate server component, a person of skill in the art should recognize that functionalities of the chat automation server may be incorporated into the multimedia/social media server 154, the knowledge management server 105, the IMR server 122, or the like.

The contact center system 102 may also include the data collection server 162 configured to retrieve data from various components of the contact center system such as, for example, the statistics server 132, and to generate reports from the aggregated data. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like). According to some example embodiments, the data collection server 162 may collect data from the components in the contact center system such as the statistics server 132 and the call controller 118 on a regular or pre-configured periodic schedule. The data collection server 162 may then operate to aggregate the data and generate graphical or text-based representations of performance metrics based on the retrieved data.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

Figure 2A:
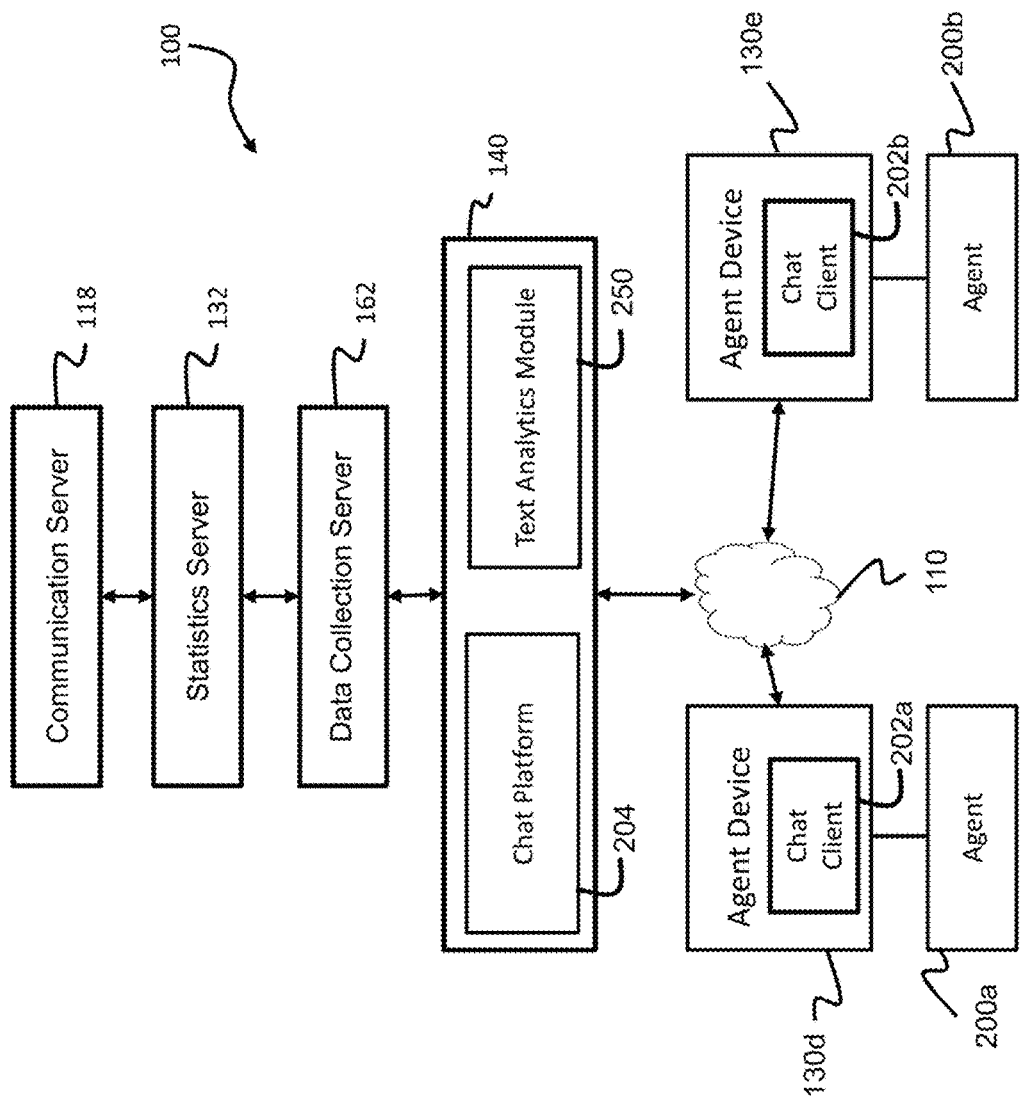
FIG. 2A is a more detailed block diagram of some components of the communication management system, according to some example embodiments of the present invention.

FIG. 2A is a more detailed block diagram of some components of the communication management system 100, according to some example embodiments of the present invention. The chat server 140 is coupled to or in electronic communication with one or more user or agent devices 130 (e.g., agent devices 130d and 130e) operated by one or more agents 200 (e.g., agents 200a and 200b, respectively) over the data communications network 110 and/or operating locally within the contact center system 102.

Each agent device 130 may have a communication or chat client or module 202 (e.g., modules 202a and 202b) operating locally on the agent device as a user interface for exchanging communications with other agent devices and the chat server 140 by way of a chat platform module 204. According to some embodiments, the chat client or module 202 may be configured to provide a graphical user interface for exchanging graphical and/or text-based communications with the chat server 140. The chat platform module 204 operates as an intermediary for receiving and transmitting information received from and to agent devices, and other components of the contact center system 102 (e.g., the data collection server 162, the statistics server 132, and the call controller 118).

The chat server 140 is further coupled to or in electronic communication with the data collection server 162. The data collection server 162 collects/retrieves data related to various performance metrics from various components of the contact center system 102, for example, the statistics server 132 and the call controller 118. As discussed above, according to some embodiments, the data collection server 162 may retrieve analytics and performance metric data from the statistics server 132 and/or the call controller 118 on a regular or pre-configured periodic schedule. Utilizing the data retrieved from the statistics server 132 and/or the call controller 118, the data collection server 162 may generate aggregated data and numerical data points representing one or more key performance indicators (KPIs) that are relevant to the business operations of the contact center.

Figure 2B:
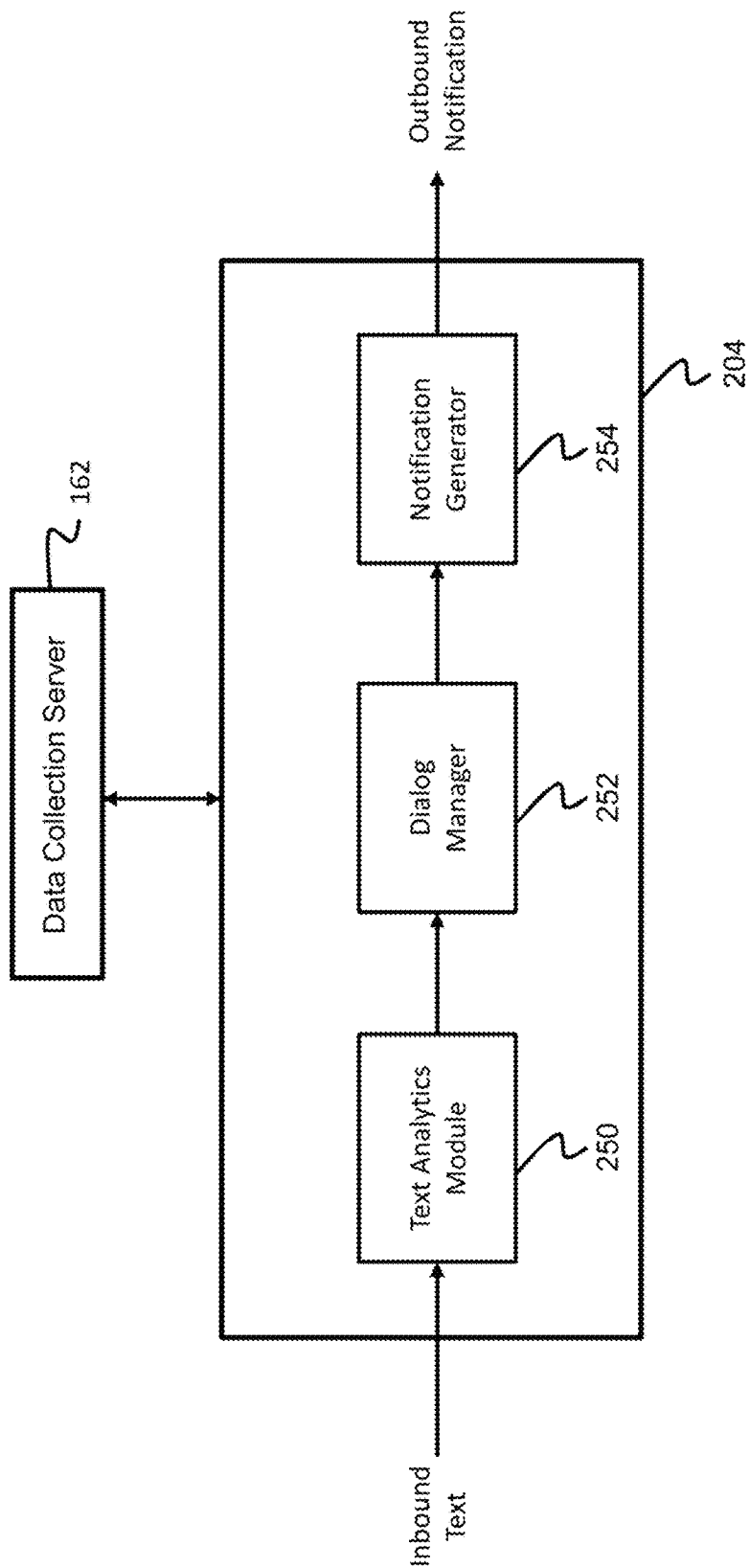
FIG. 2B is a more detailed block diagram of the chat module operating as part of the communication management system, according to some example embodiments of the present invention.

FIG. 2B is a more detailed block diagram of the chat module 204 operating as part of the communication management system 100, according to some example embodiments of the present invention. According to some example embodiments, the chat module 204 may include a text analytics module 250, a dialog manager 252, and a notification generator 254. The text analytics module 204 is configured to analyze and understand natural language. In this regard, the text analytics module may be configured with a lexicon of the language, a syntactic/semantic parser, and grammar rules for breaking a phrase provided by the agent device 130, into an internal syntactic and semantic representation.

The dialog manager 252 receives the syntactic and semantic representation from the text analytics module, and manages the general flow of the conversation based on a set of decision rules. In this regard, the dialog manager maintains history and state of the conversation.

The dialog manager 252 may further be configured to identify suggested tags based on the nature of an ongoing chat communication session in response to the inbound text and data received or retrieved from the data collection server 162, and outputs the suggested tag to the notification generator 254. For example, according to some embodiments, the text analytics module 250 and/or the dialog manager 252 may detect a trigger for suggesting a tag, based on text analytics of the chat communication session between users identifying that a particular phrase has been used, a topic of conversation has come up, or information has been shared. Alternatively, the text analytics module 250 and/or the dialog manager 252 may detect an agent inputting a predetermined command or phrase to the chat interface.

In response to detecting the trigger for suggesting the tag, the chat server 140 (e.g., the chat module 204) may provide an alert or notification to a chat client of one or more of the agent devices indicating that a portion of the chat communication session has been identified for a suggested tag, based on the portion of the chat communication session corresponding to a predetermined tag category.

According to some embodiments, as will be discussed in more detail below, users may be enabled to manually tag portions of a chat communication conversation. In addition to tagging the portion of the chat communication, the user may be enabled to include additional identifying or descriptive information for the tag. For example, the user may be enabled to select from one or more predetermined categories or topics corresponding to the portion of the conversation being tagged. Alternatively, or additionally, the user may be enabled to define a previously undefined topic or category corresponding to the portion of the conversation being tagged. In some embodiments, the system may be configured to suggest a topic or category label, based on a text analytics analysis of the text of the portion of the chat communication.

Figure 3:
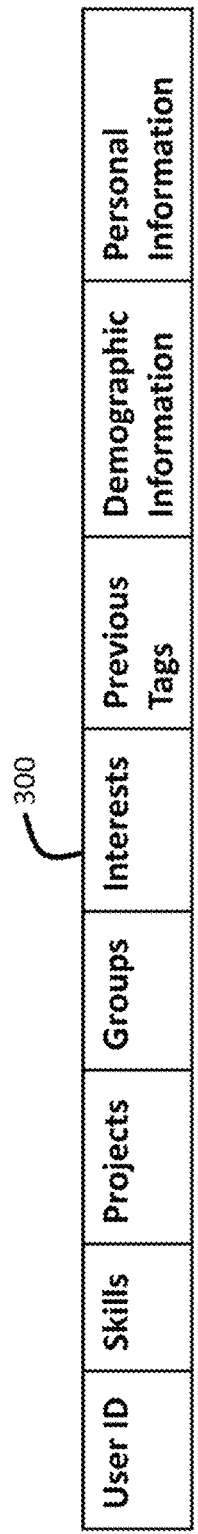
FIG. 3 illustrates an example user profile according to some example embodiments of the present invention.

FIG. 3 illustrates an example user profile according to some example embodiments of the present invention. As illustrated in FIG. 3, each user may have a corresponding user profile 300, which may be stored in memory (e.g., memory 126) as part of the communication management system 100. The user profile 300 may include various information about the user including, for example, a unique user identifier (e.g., an employee identification number, employee name, etc.), one or more skills associated with the user (e.g., sales, technical support, user experience design, engineering, etc.), one or more projects the user is working on, one or more groups or organizations of which the user is a member, one or more areas or topics of interest or expertise, demographic information, and personal information. Additionally, according to some embodiments, the user profile 300 may further include information identifying previous tags that have been generated by or associated with the user. For example, each time a user tags a particular topic or portion of a communication, the communication management system 100 may update the user profile 300 to include information about the nature (e.g., topic, category, or subject matter) of the tag. In some embodiments, as discussed, the communication management system 100 may be configured to compare information discussed during a chat communication session with information in users' profiles, in order to identify instances where suggestions for tags can be provided. The user profile 300 is not limited to the categories of data illustrated in FIG. 3, however, and the user profile 300 may include fewer categories of data, as well as any suitable additional or alternative categories of data according to the design of the communication management system 100.

Figure 4A:
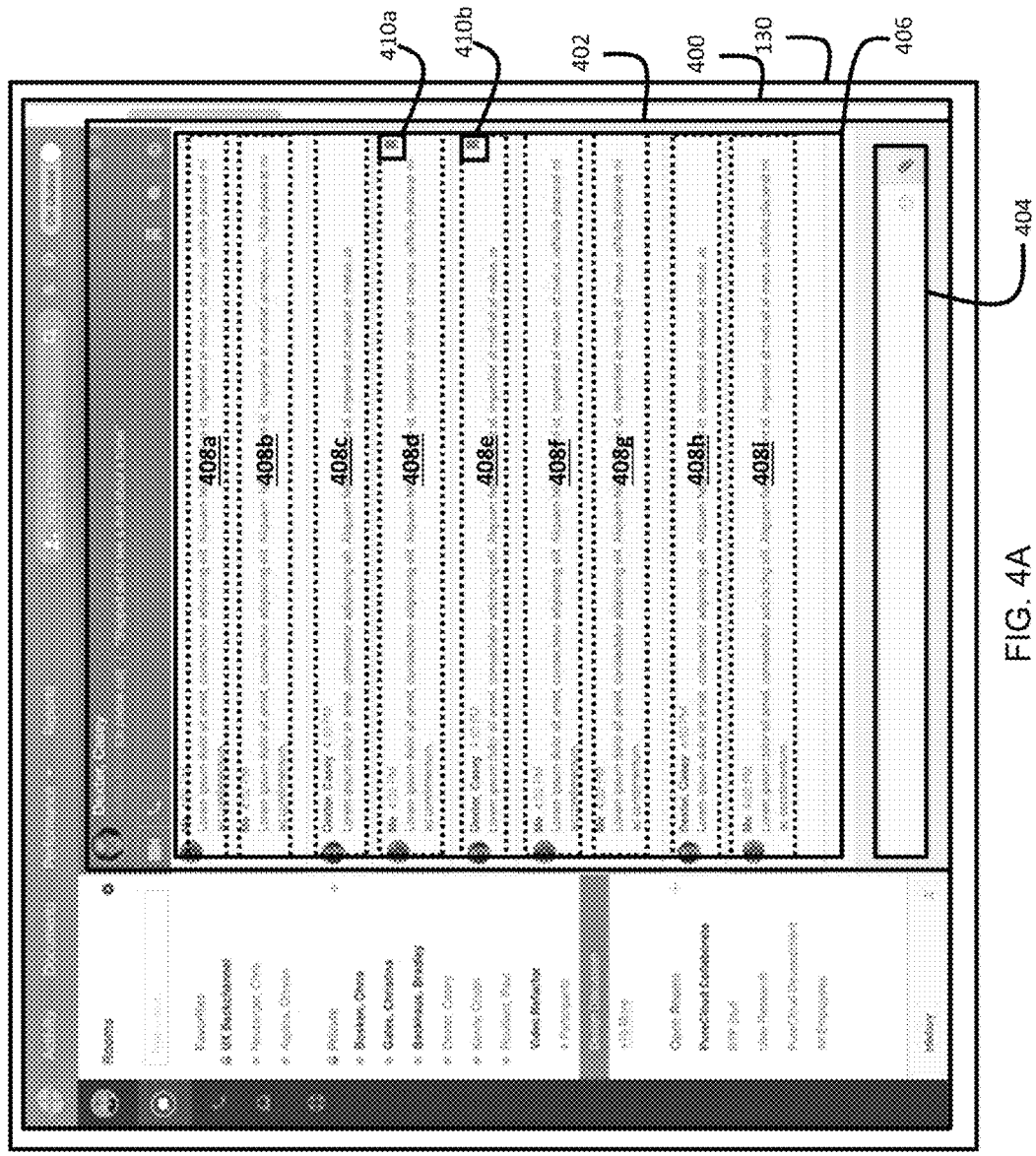
FIG. 4A illustrates an example user interface for a chat communication session according to some example embodiments of the present invention.

FIG. 4A illustrates an example user interface for a chat communication session according to some example embodiments of the present invention. As shown in FIG. 4A, the agent or user device 130 may be configured to display a user interface 400, for example, on a display device of the user device 130.

The user interface 400 includes a chat communication interface or client 402 for facilitating a chat communication session between two or more users. During the chat communication session, a user may enter text, as well as share data or documents, using a user input dialog 404. After entering text, data, or other information for sharing with other users in the user input dialog 404, the user input is displayed in a chat display 406. Each comment or entry by a user may be displayed as an independent entry 408a-408i (the number of entries 408a-408i is not limited to the number illustrated in FIG. 4A, and may include any suitable number of entries according to the duration and substance of the communication session and the design of the communication management system 100).

Throughout the communication session, participants may tag information or individual entries exchanged during the communication session, for example, by applying a tag 410 to the information to be tagged. Additionally, as discussed above, according to some embodiments, the communication management system 100 may be configured to monitor, for example, using text analytics, information exchanged during the communication session and determine whether or not information corresponds to one or more predetermined tags or categories of information. In some embodiments, the system 100 may alert the users when a potential tag is identified, enabling the users to decide whether or not to tag the information and how to classify or define the nature of the tag (e.g., by topic). Additionally, according to some embodiments, the system 100 may automatically tag information or entries in the chat communication session in response to identifying the information or entries corresponds to one or more predetermined tags or categories.

According to some example embodiments, the tags may be kept private, and may be visible only to the user creating the tag, or the users involved in the chat communication session. According to some embodiments, however, the system 100 may enable users to make tags, as well as the corresponding information or chat communication entry or entries, available to other users who are not necessarily involved in the ongoing chat communication session.

Figure 4B:
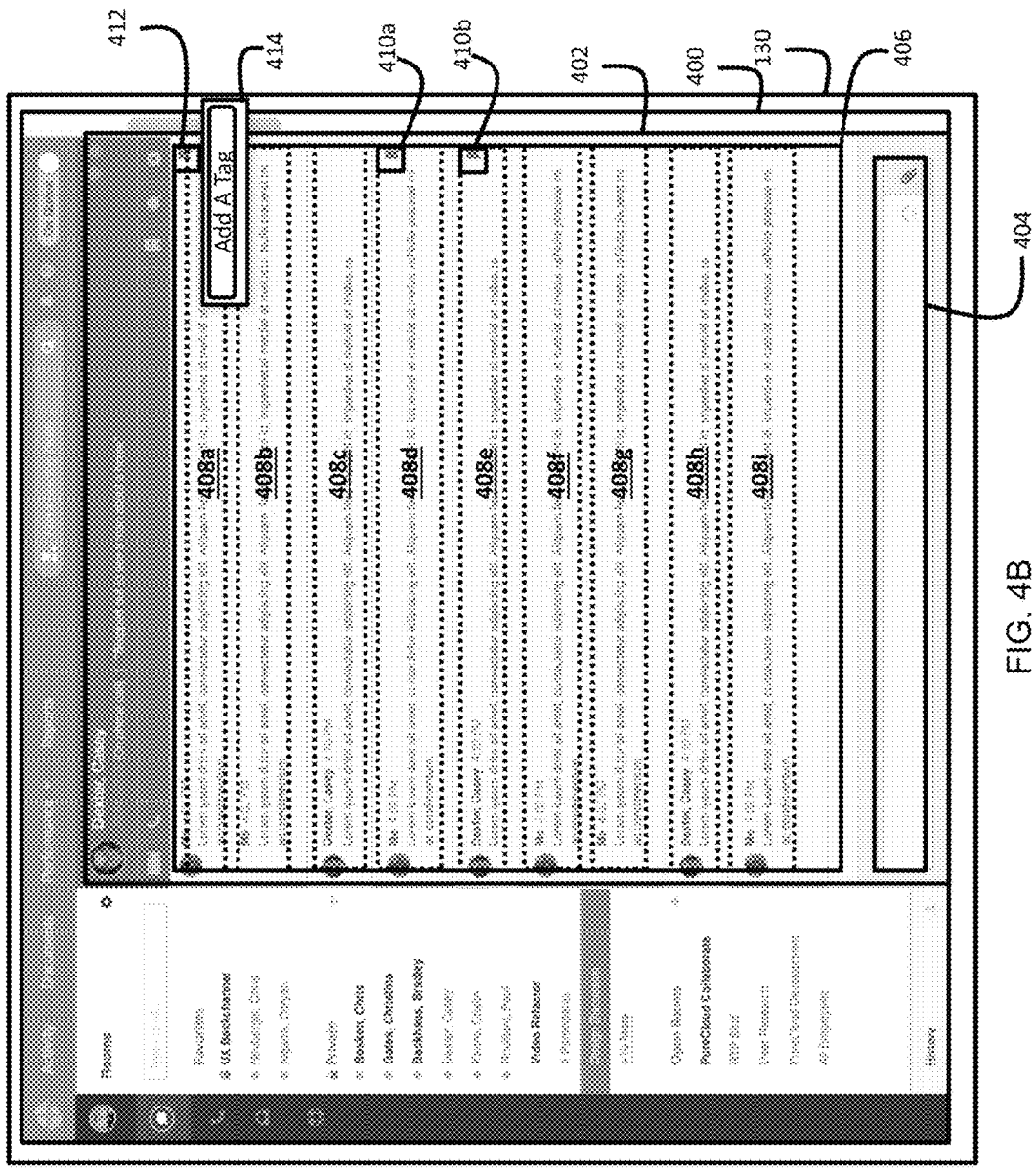
FIG. 4B illustrates an example user interface for tagging information according to some example embodiments.

FIG. 4B illustrates an example user interface for tagging information according to some example embodiments. As illustrated in FIG. 4B, the system 100 may enable users to tag information or entries in a chat conversation, for example, by displaying an icon or button 412 on or near a particular entry, portion of a communication, or piece of information exchanged during a chat communication session. According to some embodiments, the system 100 may automatically tag certain information in response to identifying the information as being relevant to or corresponding to one or more predetermined categories or tags. In instances where the system 100 automatically tags information, the user may be enabled to untag the information or modify the description or visibility of the tag (e.g., by making the tag private or public to other users). According to some example embodiments, rather than automatically tagging information, the system 100 may be configured to display an alert or notification message to suggest tagging of the information. Additionally, when the system 100 does not automatically tag information, users may be enabled to manually tag information during the chat communication session by selecting an icon or button 412 associated with the information to be tagged.

In response to a user tagging or approving a tag, the system 100 may display a text dialog 414 to enable the user to define the nature of the tag. For example, the user may select from one or more predetermined or predefined tags, or the user may enter a name and/or description of the information associated with the tag.

Each time a user tags a particular piece of information, or approves an automatically generated or automatically recommended tag, the system 100 may modify the user's profile 300 to update the tags provided by the user. Thus, each time a user introduces or approves of a new tag, the system 100 may learn from the user's behavior and recommend future tags based on the user's previous tags. For example, while monitoring an ongoing chat communication session, the system 100 may perform text analytics on the information exchanged during the chat communication session in real time, and identify information that corresponds to one or more predetermined categories of information tags, or one or more previous tags established by the user.

Figure 4C:
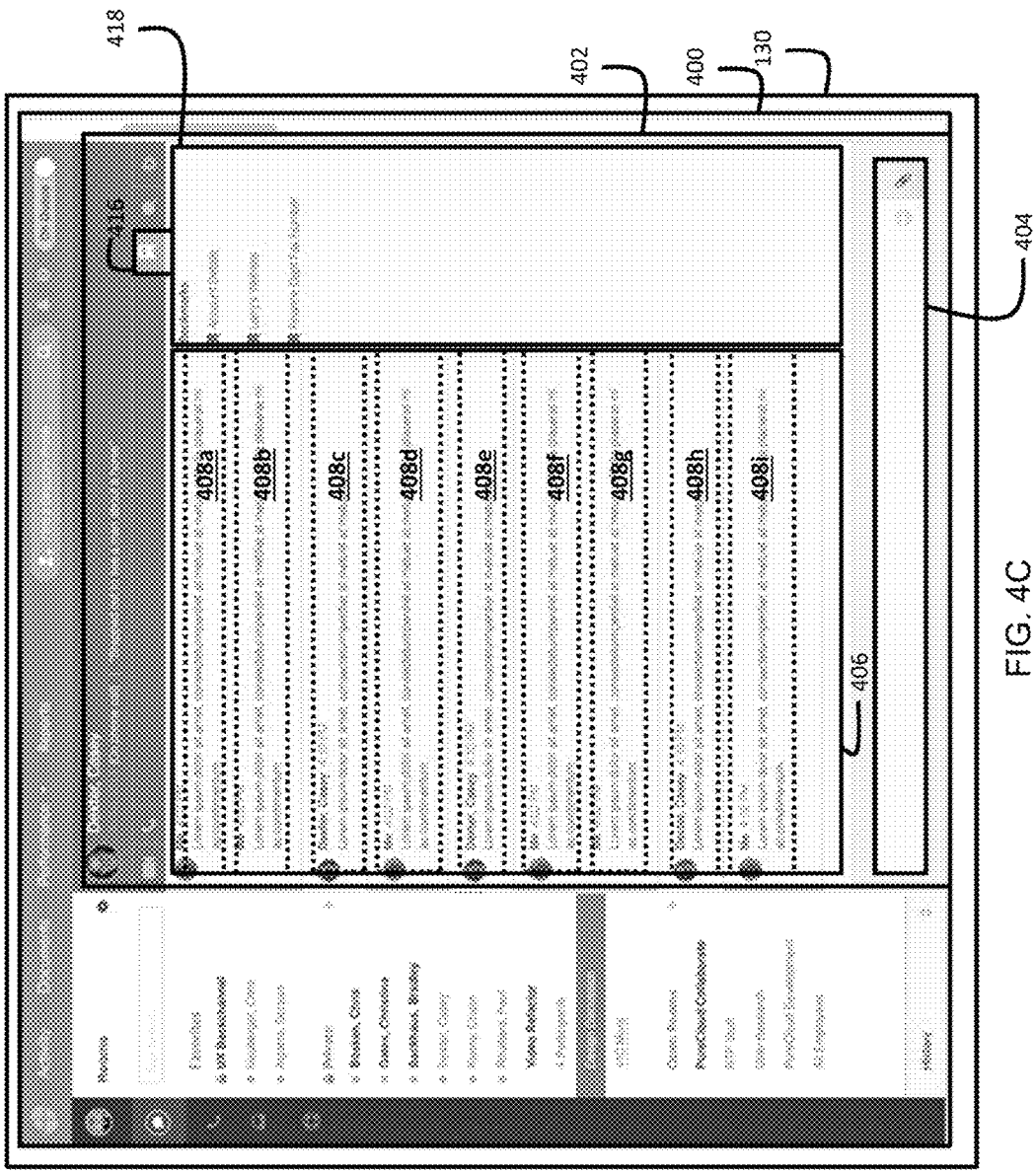
FIG. 4C illustrates an example user interface to enable users to review previous tags or bookmarks that they have utilized or agreed to for tagging information, according to some example embodiments.

FIG. 4C illustrates an example user interface to enable users to review previous tags or bookmarks that they have utilized or agreed to for tagging information, according to some example embodiments. For example, as illustrated in FIG. 4C, a navigation button or icon 416 may enable users to display a bookmark or tag window 418 for displaying a list of previous tags. In some embodiments, the tags displayed in the tag window 418 may display the tags utilized in the particular chat communication session. In some embodiments, the tags displayed in the tag window 418 may further display tags utilized by the user to tag information in other chat communication sessions aside from the chat communication session the user is currently engaged with.

Figure 4D:
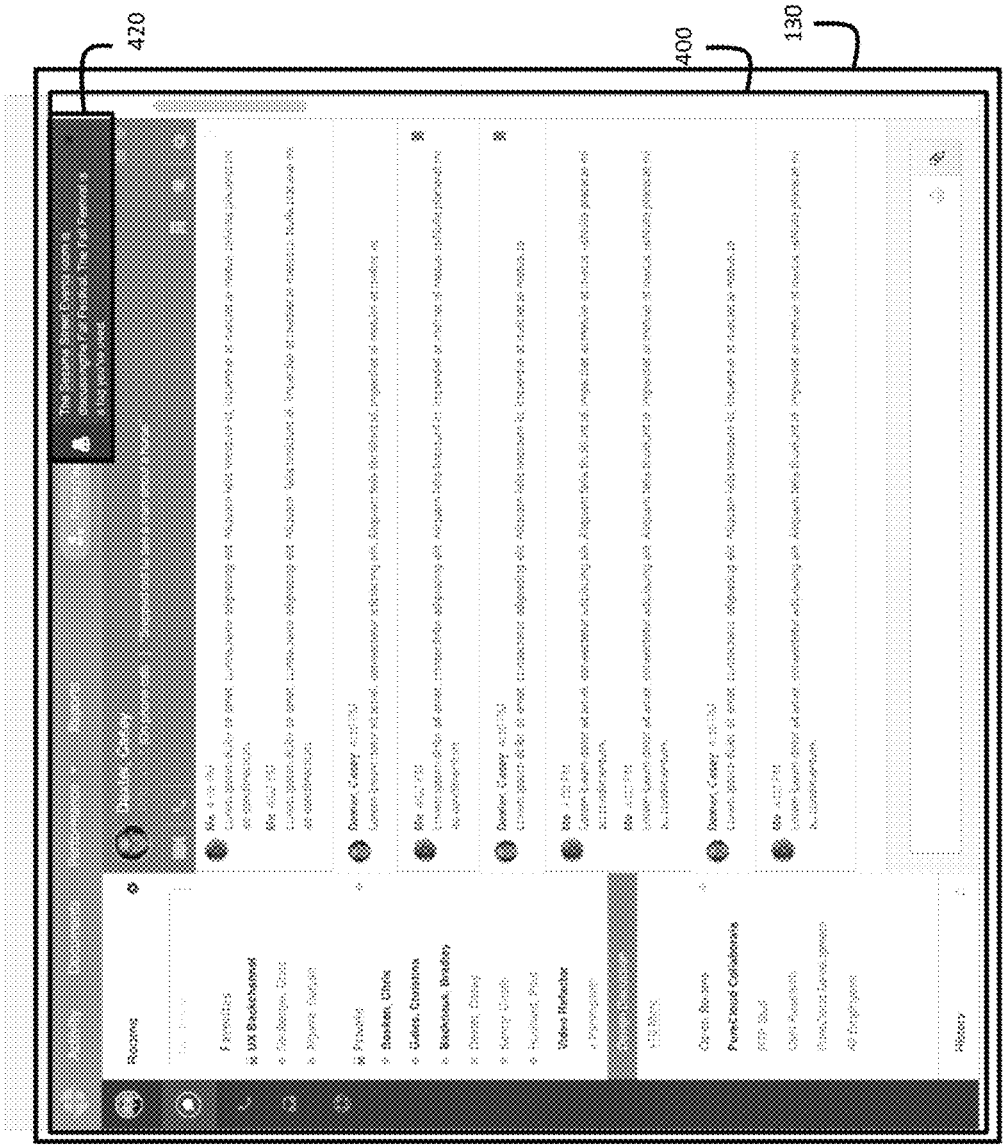
FIG. 4D is an example user interface illustrating a tag suggestion notification, according to some example embodiments.

FIG. 4D is an example user interface illustrating a tag suggestion notification, according to some example embodiments. As illustrated in FIG. 4D, in some embodiments, the system 100 may be configured to monitor chat communication sessions between different users and, using a suitable text analytics algorithm, identify information that may be relevant to other users not currently participating in the particular chat communication session exchanging the information. For example, the system 100 may display an alert or notification 420 to notify users that another group of users engaging in a chat communication session has utilized a tag that the user has also used in the past. The system 100 may enable the user to click on the notification 420 or another button or icon, to display a window showing the information tagged by the other group of users. According to some embodiments, the user may be enabled to review the other chat communication in its entirety, and may also be enabled to join the chat communication session. Alternatively, according to some embodiments, the user may be limited to viewing only the specific tagged information, or a summary of the tagged information.

Figure 4E:
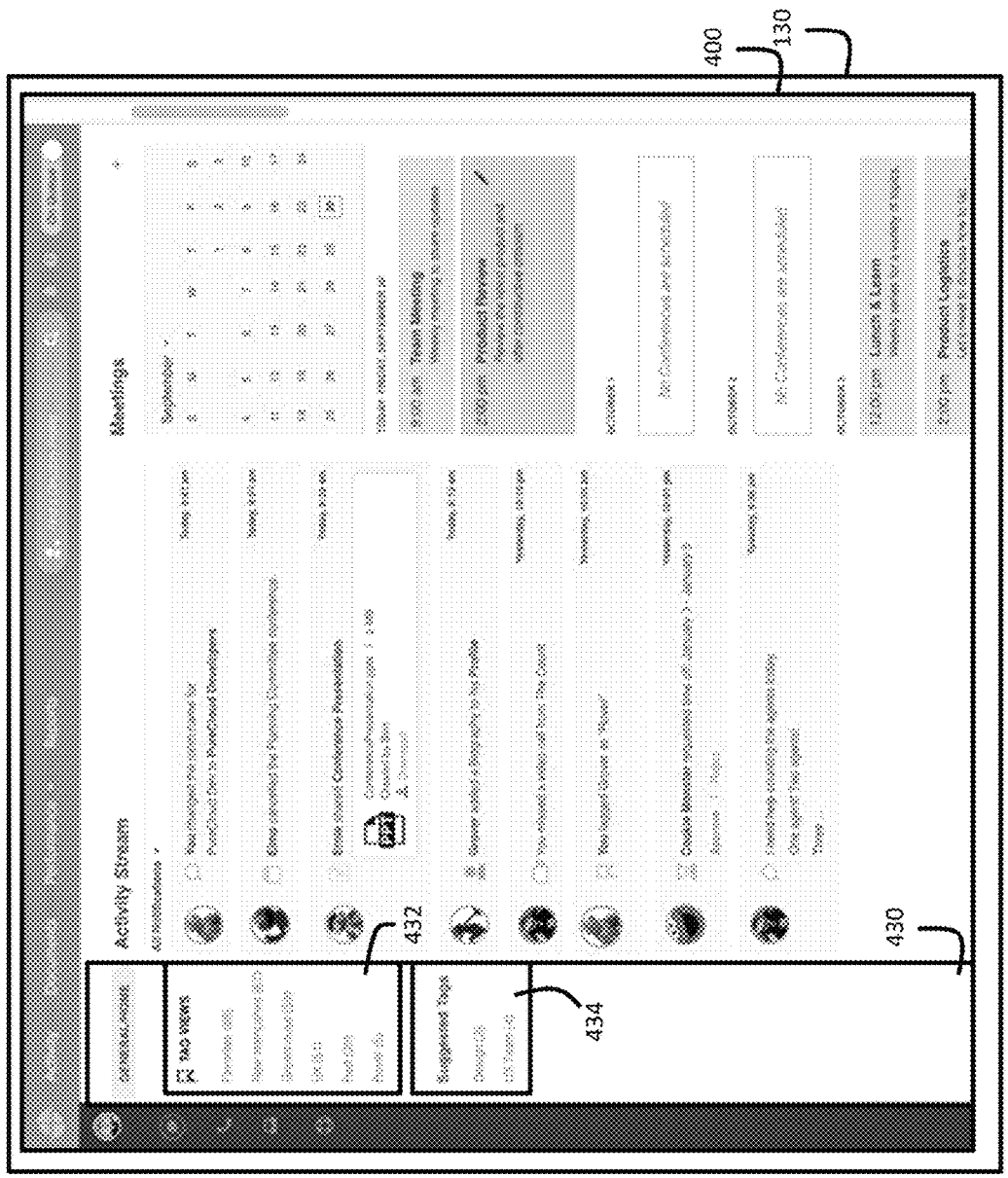
FIG. 4E illustrates a user interface for enabling users to review tagged information and suggested tags, according to some example embodiments.

FIG. 4E illustrates a user interface for enabling users to review tagged information and suggested tags, according to some example embodiments. As illustrated in FIG. 4E, the system 100 may be configured to display a window 430 showing previous tags 432 that have been established or approved by the user as well as suggested tags 434 that the user may be interested in reviewing. From among the previous tags 432, the user can select each tag to review the information they have tagged, or to review a summary or overview of the previously tagged information. The user can also review the suggested tags 434 that are generated based on chat communication sessions occurring between other users, as well as the current user's own user profile 300, as discussed above.

Figure 4F:
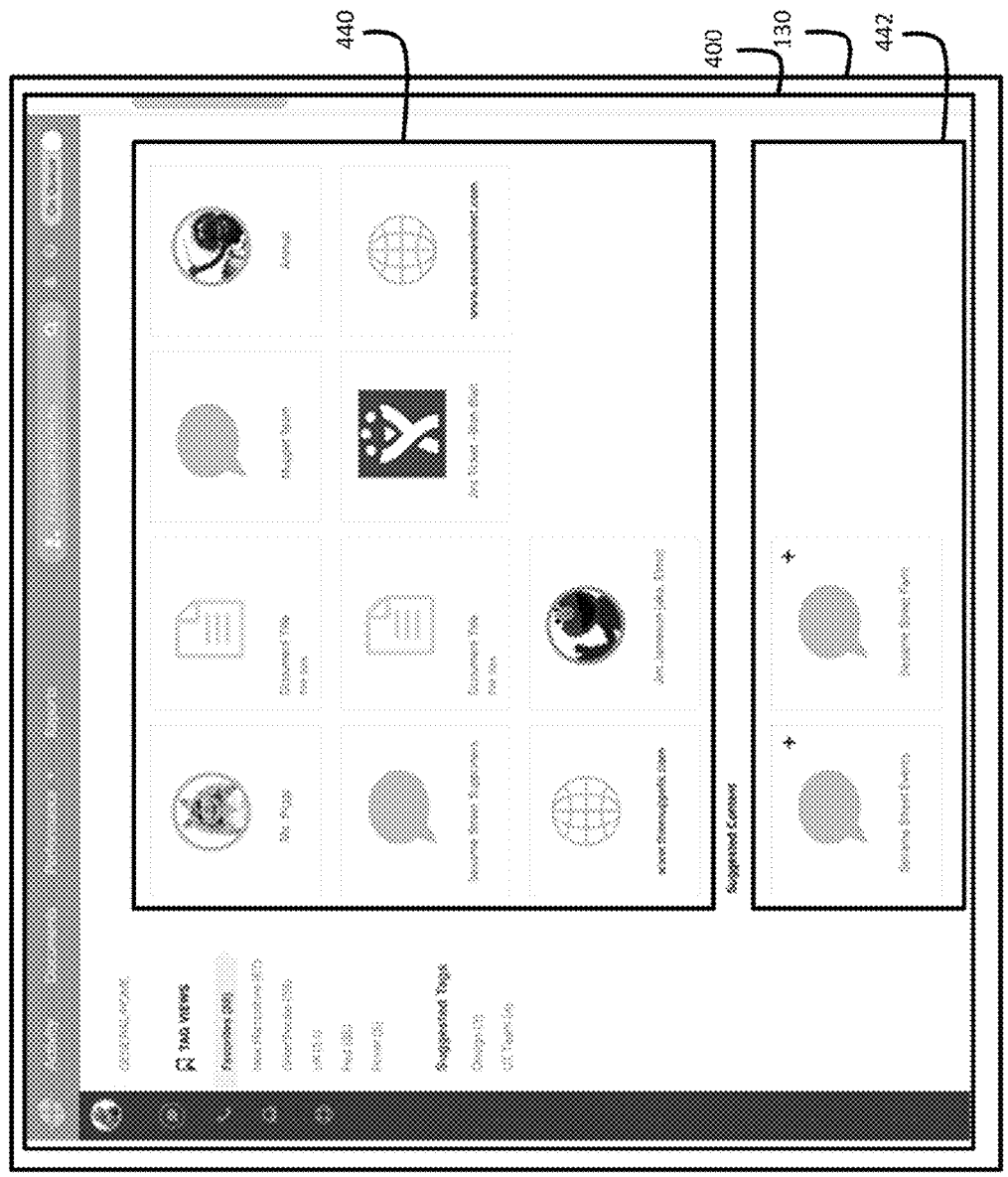
FIG. 4F illustrates a user interface for reviewing previous and suggested tags, according to some example embodiments.

FIG. 4F illustrates a user interface for reviewing previous and suggested tags, according to some example embodiments. As illustrated in FIG. 4F, in response to a user selecting a previous tag or a category of previous tags (e.g., "favorites"), the system may display a window 440 that displays the users previous tags within the selected category. Additionally, the system 100 may further display suggested content 442 for adding to the list of tagged content shown in the window 440. For example, the suggested content may correspond to information being exchanged in other chat communication sessions that the user is not involved in, and the system 100 may be configured to identify the information as being potentially interesting or useful to the user based on the user's profile and previous tagging history, as discussed above.

Figure 4G:
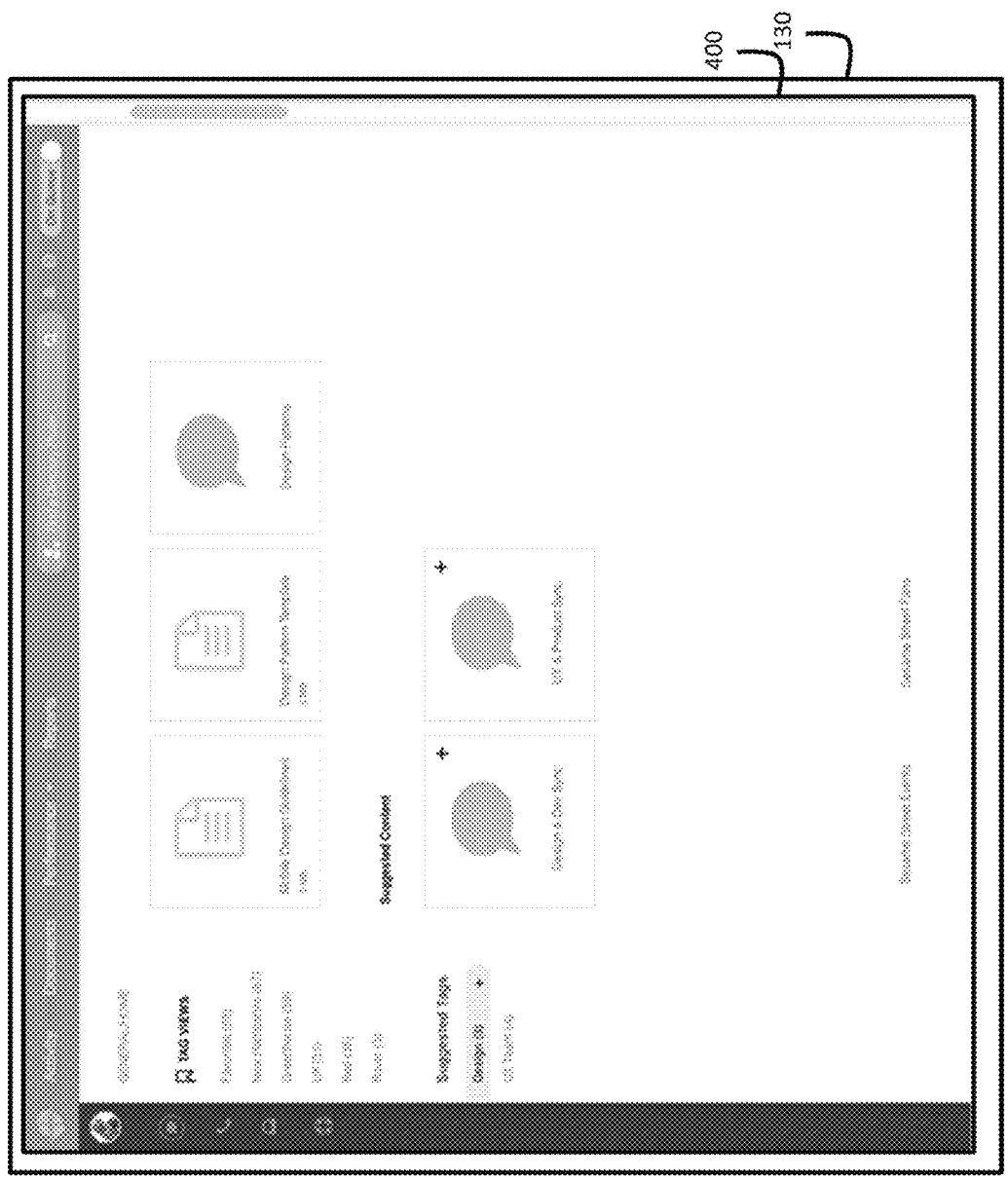
FIG. 4G illustrates a user interface for reviewing suggested tags, according to some example embodiments.

FIG. 4G illustrates a user interface for reviewing suggested tags, according to some example embodiments. As illustrated in FIG. 4G, according to some embodiments, in response to a user selecting one of the suggested tags or tag categories 434, described above with respect to FIG. 4E, the system 100 may be configured to display additional tags or categories of information that the user may wish to add to the list of tags 432. For example, the system 100 may identify a particular skillset or project associated with the user, and identify tags or categories of tags that correspond to the skillset or project, and recommend the tags to the user. Subsequently, once a user adds or selects a tag, the system may notify the user of other chat communication sessions, or information exchanged in other chat communication sessions, that utilize the tag. Additionally, the system 100 may utilize the group of tags 432 when determining whether or not to recommend tagging particular information being exchanged in a chat communication session that the user is involved in.

Figure 5:
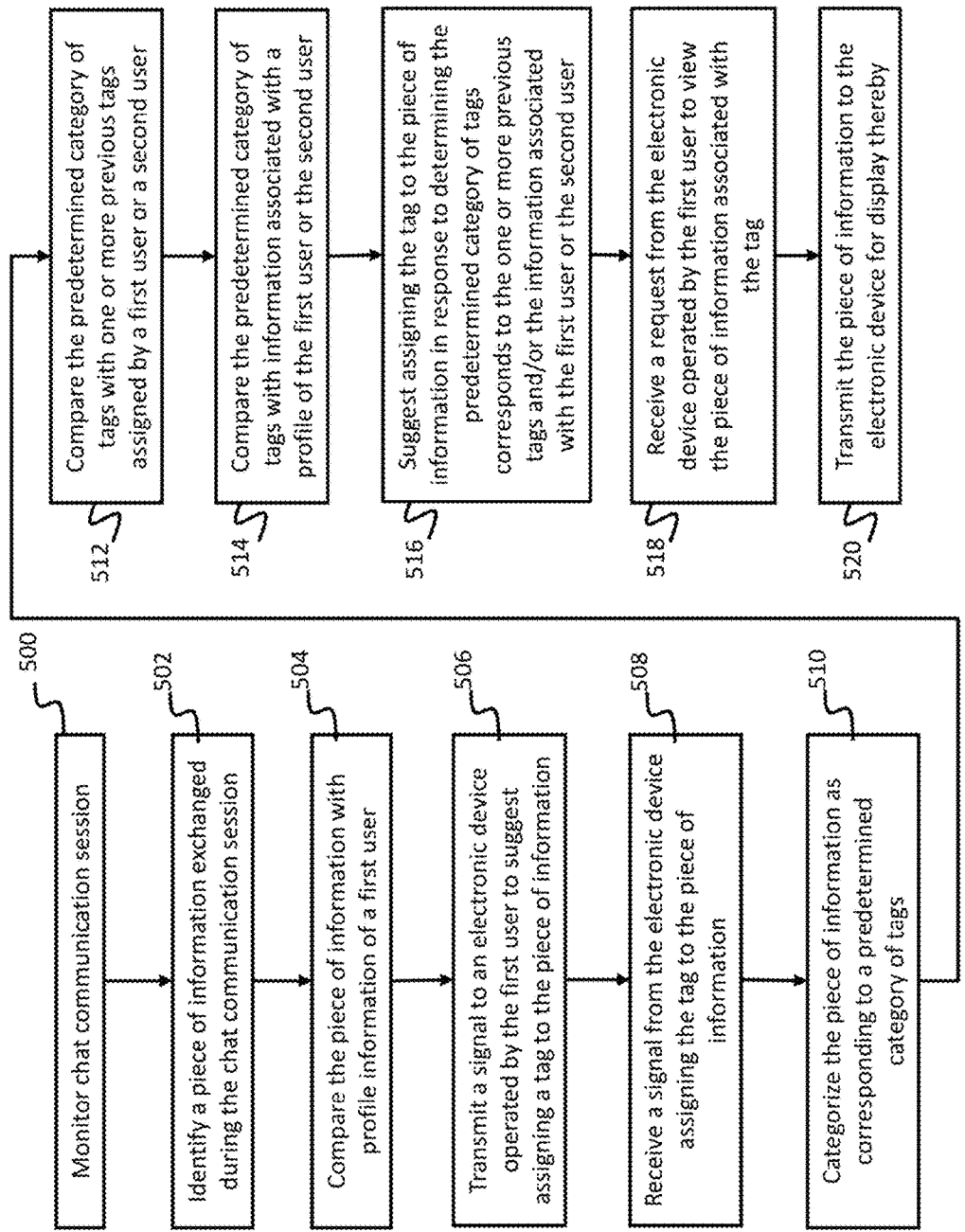
FIG. 5 is a flow diagram illustrating aspects of a process for managing communications, according to some example embodiments.

FIG. 5 is a flow diagram illustrating aspects of a process for managing communications, according to some example embodiments. Embodiments of the present invention are not limited to the steps limited in FIG. 5, however. For example, some embodiments may include additional operations, fewer operations, and/or alternative operations, and the order of the operations may vary in some instances, unless otherwise stated or implied by the relative operations.

Referring to FIG. 5, at 500, the system may be configured to monitor one or more ongoing chat communication sessions between users or members of an organization. At 502, the system may identify a piece of information exchanged during the chat communication session. For example, during chat communication sessions, the system may utilize text analytics to parse and interpret language or data exchanged during the communication session.

At 504, the system may compare the piece of information with profile information of a first user. For example, the system may identify the piece of information as corresponding to one or more categories or classifications of information (e.g., categories of tags or bookmarks), and compare the information with information in users' profiles such as previous tags that users have assigned to information, user skill sets, projects the users are working on, areas of interest, and the like. In response to determining that the piece of information corresponds to information in a user's profile, after executing 504, the system may transmit, at 506, a signal to an electronic device operated by the user to suggest assigning a tag to the piece of information. For example, the system may identify the piece of information as corresponding to or being similar to information that was previous assigned a particular tag by the user, or relevant to a skill set, project, working group, or interest of the user, and the system may display a notification to the user to consider assigning a tag to the new piece of information.

At 508, the system may receive a signal from the electronic device operated by the user, in which the signal includes information indicating the user would like to assign a tag to the piece of information. The system may store the tag in memory, and also update the user's profile to reflect the information being tagged (e.g., the nature or category of the information and/or the tag). At 510, the system may categorize the information as corresponding to a predetermined category of tags. For example, the system may identify, based on a text analytics analysis, that the piece of information relates to a particular workgroup or project (or any other suitable category of tags).

Then, at 512, the system may compare the predetermined category of tags with one or more previous tags assigned by the first user who is participating in the chat communication session, or a second user who is not participating in the chat communication session. Additionally, or alternatively, at 514, the system may compare the predetermined category of tags with information associated with a profile of the first user participating in the chat communication session, or the second user who is not participating in the chat communication session.

In response to identifying that the predetermined category of tags corresponding to the piece of information also corresponds to a previous tag or profile information of the first or second user, at 516, the system may transmit an alert to the electronic device operated by the first user and/or the second user suggesting assigning a tag to the piece of information. Additionally, or alternatively, the system may transmit an alert to the electronic device operated by the first user and/or the second user to suggest reviewing the information.

At 518, the system may receive a request from the electronic device operated by the first user or the second user to view the piece of information associated with the tag. For example, according to some embodiments, the system may transmit a signal to the electronic device operated by the first user and/or the second user to display a user interface configured to display the piece of information in response to the request.

In response to receiving the request, the system may transmit, at 520, the piece of information to the electronic device operated by the first user or the second user for display thereby.

Embodiments of the present invention, therefore, provide a mechanism to enable participants in a chat communication session to identify or tag important portions of a conversation for later referencing. In addition to enabling users to manually identify and tag information, according to some example embodiments, the system may be configured to automate the tagging of information. For example, according to some embodiments, the system may be configured to monitor chat communications and, using text analytics, identify topics of conversation or important information. In some instances, after detecting a keyword, phrase, snippet of information, or conversation topic, the system may be configured to display an alert message for prompting the members of the chat communication to tag the information. Additionally, according to some example embodiments, the system may automatically tag the identified information, for example, after comparing the identified information with one or more predetermined categories of tags, and assign corresponding identifying information to the tag to enable users to subsequently refer back to the automatically tagged information.

According to some embodiments, when a member joins a chat communication session that already has one or more tags associated with one or more comments or pieces of information, the system may be configured to transmit an alert to the electronic device operated by the new member, for notifying the new member of the important tags that they should be aware of.

Additionally, according to some example embodiments, the system may be configured to identify members of an organization that may be interested in being alerted about conversations or information being exchanged in a chat conversation to which they are not a party. For example, a team member or engineer involved in particular projects, or with areas of interest or expertise, may desire to be alerted if other users identify or tag information in a chat communication that relates to the particular projects, areas of interest, skills, or areas of expertise. Additionally, the system may identify instances where information is tagged in an ongoing chat communication session and alert other members of the organization who have tagged similar information or assigned related tags to information that the other members of the organization may be interested in being a part of the ongoing chat communication session.

Thus, according to some example embodiments, the system may be configured to compare identifying information that characterizes the nature or topic of a tag with profile information of a plurality of members of an organization. In cases where the tag corresponds to an area of interest of a member of the organization, the system may be configured to alert the user of the tag, thereby providing the member, who was not involved in the chat communication, to review and reference the tagged information.

Thus, embodiments of the present invention may provide a platform for users (e.g., members of an organization and/or employees in a business) to engage in chat communication sessions with other users. During the chat communication session, the platform may provide an interface or mechanism to enable users to tag or identify information, such as words, phrases, data, documents, projects, and the like, that are exchanged or shared during the communication session.

Embodiments of the present invention provide intelligence to agents in a chat group to give them in real-time information about what is going on within the contact center, and provide a platform for managing and troubleshooting the operating of the contact center system.

In one embodiment, each of the various servers, controllers, switches, gateways, engines, and/or modules (collectively referred to as servers) in the afore-described figures are implemented via hardware or firmware (e.g. ASIC) as will be appreciated by a person of skill in the art.

In one embodiment, each of the various servers, controllers, switches, gateways, engines, and/or modules (collectively referred to as servers) in the afore-described figures is a process or thread, running on one or more processors, in one or more computing devices 1500 (e.g., FIG. 6A, FIG. 6B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 6A:
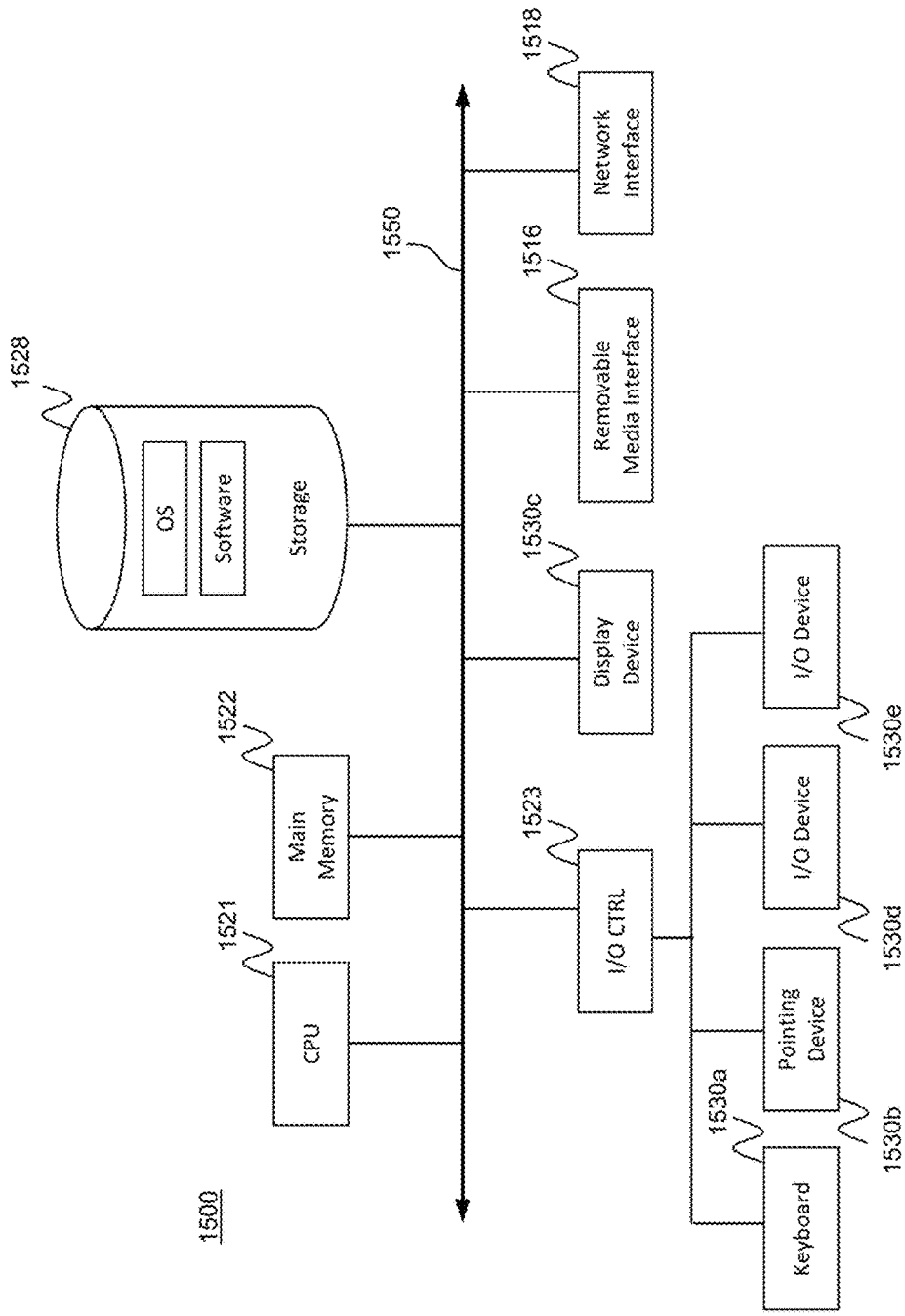
FIG. 6A is a block diagram of a computing device according to an exemplary embodiment of the present invention.
Figure 6B:
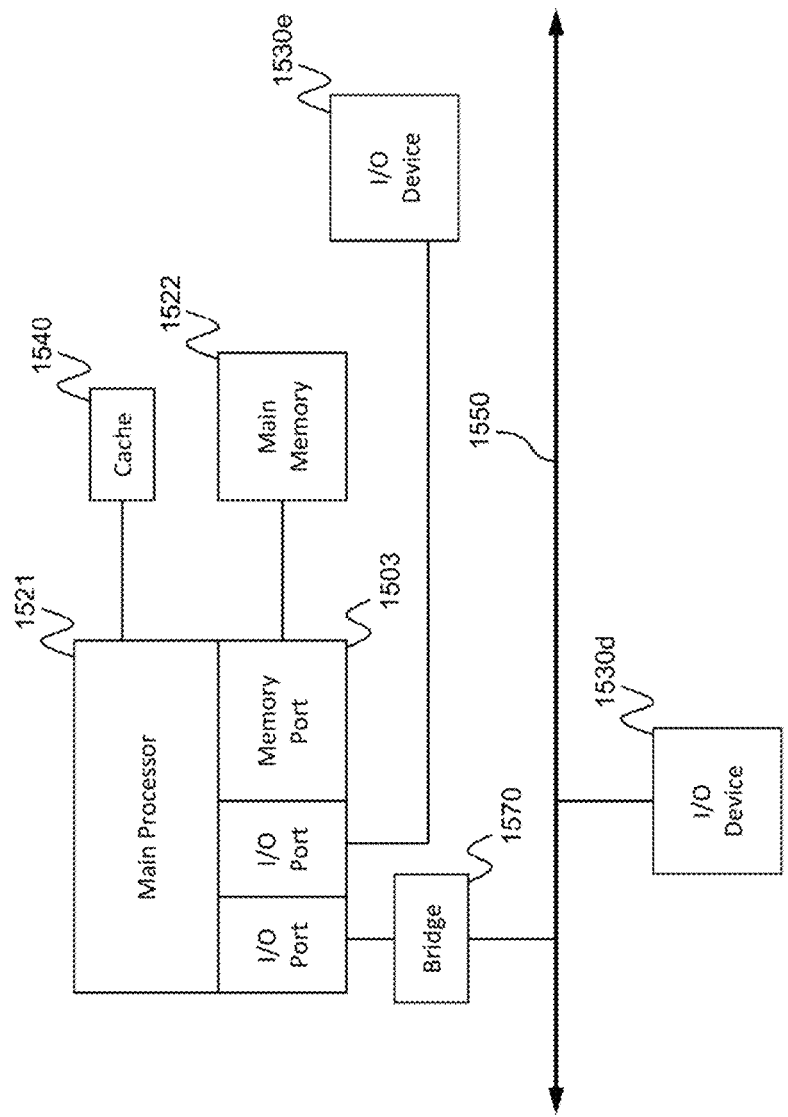
FIG. 6B is a block diagram of a computing device according to an exemplary embodiment of the present invention.

FIG. 6A and FIG. 6B depict block diagrams of a computing device 1500 as may be employed in exemplary embodiments of the present invention. Each computing device 1500 includes a central processing unit 1521 and a main memory unit 1522. As shown in FIG. 6A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 6B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 6A, the central processing unit 1521 communicates with the main memory 1522 via a system bus 1550. As shown in FIG. 6B, the central processing unit 1521 may also communicate directly with the main memory 1522 via a memory port 1503.

FIG. 6B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 6A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 6B depicts an embodiment of a computer 1500 in which the central processing unit 1521 communicates directly with I/O device 1530e. FIG. 6B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 6A, may control the I/O devices. The I/O controller may control one or more I/O devices such as a keyboard 1530a and a pointing device 1530b, e.g., a mouse or optical pen.

Referring again to FIG. 6A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 6A and FIG. 6B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figures 6C, 6D:
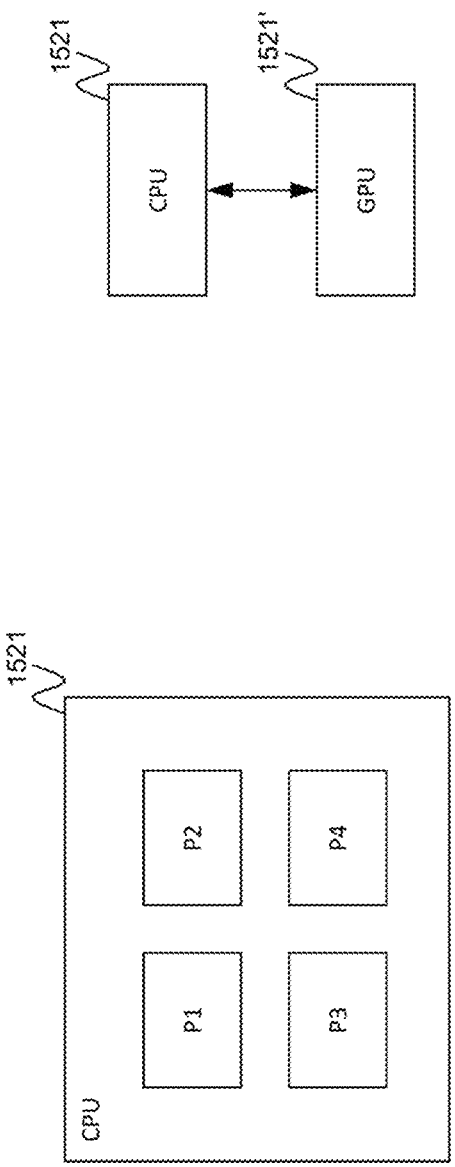
FIG. 6C is a block diagram of a computing device according to an exemplary embodiment of the present invention.
FIG. 6D is a block diagram of a computing device according to an exemplary embodiment of the present invention.

As shown in FIG. 6C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 6D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 6E:
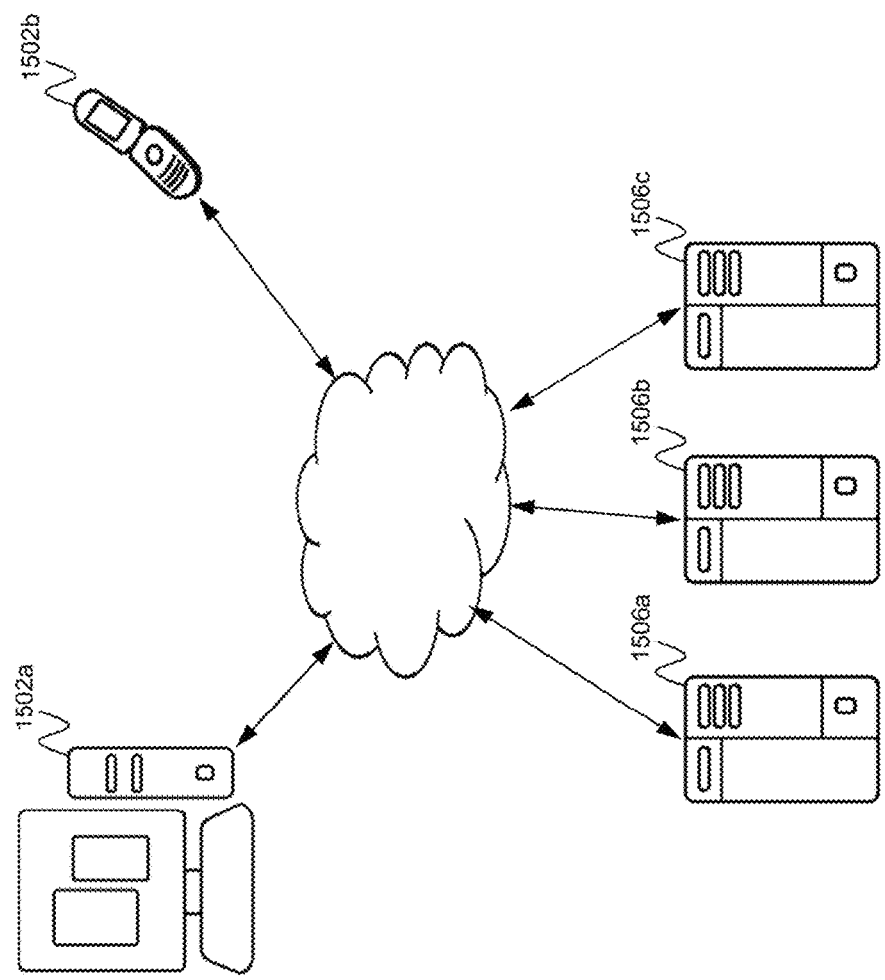
FIG. 6E is a block diagram of a network environment including several computing devices according to an exemplary embodiment of the present invention.

A computing device may be one of a plurality of machines connected by a network, or it may comprise a plurality of machines so connected. FIG. 6E shows an exemplary network environment. The network environment comprises one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 6E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 6E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

Although this invention has been described in certain specific embodiments, those skilled in the art will have no difficulty devising variations to the described embodiment, which in no way depart from the scope and spirit of the present invention. Furthermore, to those skilled in the various arts, the invention itself herein will suggest solutions to other tasks and adaptations for other applications. It is the applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A communication system comprising:
    a processor; and
    a memory, the memory storing instructions that, when executed by the processor, cause the processor to:
        monitor a first chat communication session;
        identify a piece of information exchanged during the first chat communication session;
        compare the piece of information with profile information of a first user participating in the first chat communication session;
        transmit a signal to an electronic device operated by the first user to suggest assigning a tag to the piece of information;
        receive a request from the electronic device operated by the first user to view the piece of information associated with the tag;
        transmit the piece of information to the electronic device operated by the first user for display thereby; and
        transmit, in real-time during the first chat communication session, an alert to an electronic device operated by a second user, the second user participating in a second chat communication and not participating in the first chat communication session, the alert comprising a notification that the tag was assigned to the piece of information.

2. The communication system of claim 1, wherein the instructions further cause the processor to receive a signal from the electronic device operated by the first user assigning the tag to the piece of information.

3. The communication system of claim 1, wherein the instructions further cause the processor to categorize the piece of information as corresponding to a predetermined category of tags.

4. The communication system of claim 3, wherein the instructions further cause the processor to compare the predetermined category of tags with one or more previous tags assigned by the first user and suggest assigning the tag to the piece of information in response to determining the predetermined category of tags corresponds to the one or more previous tags assigned by the first user.

5. The communication system of claim 3, wherein the instructions further cause the processor to compare the predetermined category of tags with information associated with a profile of the first user and suggest assigning the tag to the piece of information in response to determining the predetermined category of tags corresponds to the information associated with the profile of the first user.

6. The communication system of claim 1, wherein the instructions further cause the processor to:
    categorize the piece of information as corresponding to a predetermined category of tags;
    compare the predetermined category of tags with one or more previous tags assigned by the second user; and
    transmit the alert to the second user in response to the predetermined category of tags corresponding to the one or more previous tags assigned by the second user.

7. The communication system of claim 1, wherein the instructions further cause the processor to:
    categorize the piece of information as corresponding to a predetermined category of tags;
    compare the predetermined category of tags with information associated with a profile of the second user; and
    transmit the alert to the second user in response to the predetermined category of tags corresponding to the information associated with the profile of the second user.

8. A method of managing a communication system, the method comprising:
    monitoring, by a processor, a first chat communication session;
    identifying, by the processor, a piece of information exchanged during the first chat communication session;
    comparing, by the processor, the piece of information with profile information of a first user participating in the first chat communication session;
    transmitting, by the processor, a signal to an electronic device operated by the first user to suggest assigning a tag to the piece of information;
    receiving, by the processor, a request from the electronic device operated by the first user to view the piece of information associated with the tag;
    transmitting, by the processor, the piece of information to the electronic device operated by the first user for display thereby; and
    transmitting, by the processor in real-time during the first chat communication session, an alert to an electronic device operated by a second user, the second user participating in a second chat communication and not participating in the first chat communication session, the alert comprising a notification that the tag was assigned to the piece of information.

9. The method of claim 8, further comprising receiving, by the processor, a signal from the electronic device operated by the first user assigning the tag to the piece of information.

10. The method of claim 8, further comprising categorizing, by the processor, the piece of information as corresponding to a predetermined category of tags.

11. The method of claim 10, further comprising comparing, by the processor, the predetermined category of tags with one or more previous tags assigned by the first user and suggest assigning the tag to the piece of information in response to determining the predetermined category of tags corresponds to the one or more previous tags assigned by the first user.

12. The method of claim 10, further comprising comparing, by the processor, the predetermined category of tags with information associated with a profile of the first user and suggest assigning the tag to the piece of information in response to determining the predetermined category of tags corresponds to the information associated with the profile of the first user.

13. The method of claim 8, further comprising:
categorizing, by the processor, the piece of information as corresponding to a predetermined category of tags;
comparing, by the processor, the predetermined category of tags with one or more previous tags assigned by the second user; and
transmitting, by the processor, the alert to the second user in response to the predetermined category of tags corresponding to the one or more previous tags assigned by the second user.

14. The method of claim 8, further comprising:
categorizing, by the processor, the piece of information as corresponding to a predetermined category of tags;
comparing, by the processor, the predetermined category of tags with information associated with a profile of the second user; and
transmitting, by the processor the alert to the second user in response to the predetermined category of tags corresponding to the information associated with the profile of the second user.

15. A communication system comprising:
means for monitoring a first chat communication session;
means for identifying a piece of information exchanged during the first chat communication session;
means for comparing the piece of information with profile information of a first user participating in the first chat communication session;
means for transmitting a signal to an electronic device operated by the first user to suggest assigning a tag to the piece of information;
means for receiving a request from the electronic device operated by the first user to view the piece of information associated with the tag;
means for transmitting the piece of information to the electronic device for display thereby; and
means transmitting, in real-time during the first chat communication session, an alert to an electronic device operated by a second user, the second user participating in a second chat communication and not participating in the first chat communication session, the alert comprising a notification that the tag was assigned to the piece of information.

16. The communication system of claim 15, further comprising means for receiving a signal from the electronic device assigning the tag to the piece of information.

17. The communication system of claim 15, further comprising:
means for categorizing the piece of information as corresponding to a predetermined category of tags; and
means for comparing the predetermined category of tags with one or more previous tags assigned by the first user and suggest assigning the tag to the piece of information in response to determining the predetermined category of tags corresponds to the one or more previous tags assigned by the first user.

18. The communication system of claim 15, further comprising:
means for categorizing the piece of information as corresponding to a predetermined category of tags; and
means for comparing the predetermined category of tags with information associated with a profile of the first user and suggest assigning the tag to the piece of information in response to determining the predetermined category of tags corresponds to the information associated with the profile of the first user.

* * * * *